United States Patent

[11] 3,582,002

| [72] | Inventors | Theodore Ashmead Langstroth;<br>William Joseph Miles, both of Cincinnati, Ohio |
|---|---|---|
| [21] | Appl. No. | 710,653 |
| [22] | Filed | Mar. 5, 1968 |
| [45] | Patented | June 1, 1971 |
| [73] | Assignee | Sterling Drug Inc.<br>New York, N.Y. |

[54] METHOD FOR COMMINUTING CYANURIC CHLORIDE CRYSTALS
1 Claim, No Drawings

[52] U.S. Cl. ................................................ 241/5
[51] Int. Cl. ........................................ B02c 19/06
[50] Field of Search ............................. 241/1, 5, 39
23/Inquiry; 106/Inquiry; 252/Inquiry

[56] References Cited

UNITED STATES PATENTS

| 2,032,827 | 3/1936 | Andrews | 241/5 |
|---|---|---|---|
| 2,449,028 | 9/1948 | Walker | 241/5X |
| 2,735,787 | 2/1956 | Eastman | 241/39X |
| 2,914,391 | 11/1959 | Stratford | 241/5X |
| 3,425,638 | 2/1969 | Doyle | 241/39 |
| 3,229,918 | 1/1966 | Trost | 241/39 |

*Primary Examiner*—Donald G. Kelly
*Attorneys*—Elmer J. Lawson, B. Woodrow Wyatt, Thomas L. Johnson, Robert K. Bair, R. Clifford Bourgeois, William G. Webb and Roger T. Wolfe ABSTRACT: Finely divided solid cyanuric chloride having high chemical reactivity is prepared by reducing the size of relatively large cyanuric chloride particles to an average particle size of 2 to 8 microns in fluid energy attrition apparatus.

METHOD FOR COMMINUTING CYANURIC CHLORIDE CRYSTALS

This invention relates to the comminution of solid material. More particularly, it relates to improvements in a method for grinding the commercial organic chemical product, cyanuric chloride.

Cyanuric chloride, also called 2,4,6-trichloro-s-triazine, is a well-known chemical intermediate useful in preparing many of the commercial triazinylstilbene-type optical brightening agents, reactive-type dyes, and herbicides. It is known as highly reactive material comparable in chemical properties to the acyl chlorides. As an article of commerce, cyanuric chloride is ordinarily supplied in the form of rather large crystals of about 50 to 200 microns in diameter. The relatively small ratio of surface area to weight of this form of the compound considerably lessens its chemical reactivity and in particular its tendency to hydrolyze, and thus it can more easily be supplied in pure form. In use as a chemical reactant, the large-crystal commercial form of cyanuric chloride is ordinarily dissolved in a suitable solvent or is first converted to a very finely divided form to increase its chemical reactivity. The common solvents for cyanuric chloride, such as ether, benzene, acetone, toluene, dioxane, and the like, are both expensive and dangerous to employ in the large quantities required for chemical synthesis on a commercial scale, and the presence of these solvents causes undesired side reactions, affecting the yield and quality of the final product.

For use as a reactant in the manufacture of optical brightening agents, cyanuric chloride is commonly dissolved in acetone and precipitated rapidly with a large quantity of ice and water to precipitate very fine, highly reactive crystals. The use of the aqueous-acetone mixtures instead of acetone solutions diminishes but does not eliminate the fire hazard, and moreover the acetone cannot be recovered economically from the aqueous mixture. Furthermore, the presence of the acetone causes side reactions in the synthesis giving poor yields.

The feasibility of using finely divided solid cyanuric chloride instead of organic solutions of this reactant, for instance in the preparation of bis(triazinyl) stilbenedisulfonic acid type optical brighteners, has been recognized for some time. Although precipitation from water-miscible organic solvents under the proper conditions generally produces cyanuric chloride particles of satisfactory size, this procedure of course does not eliminate the drawbacks associated with the use of water-miscible organic solvents. Moreover, the use of water-immiscible solvents has the disadvantage of causing part of the cyanuric chloride to recrystallize in the form of relatively large crystals while the greater amount of the cyanuric chloride solution tends to form an emulsion with the aqueous solution of diaminostilbenedisulfonic acid used in the reaction. This in effect reduces the reactivity of the cyanuric chloride and consequently results in unsatisfactory yields.

Attempts have been made to eliminate the use of organic solvents by resort to purely mechanical methods for reducing the size of commercial cyanuric chloride particles to an average of 8 microns or less. However, these attempts have been notably unsuccessful in large-scale production, primarily because of the extreme hardness of cyanuric chloride particles. For instance, milling cyanuric chloride particles with quartz sand at high speed in water has proven to be ineffective for reducing their size, possibly because of the low density of the sand. When cyanuric chloride particles are milled in water at high speed in the presence of steel shot, the latter is eroded and an undesirable brown color is imparted to the product. It is also very difficult to free the thus ground cyanuric chloride from the steel shot. Dry mechanical grinding methods for reducing the crystalline size in such equipment as a ball mill or a pulverizer are difficult at best because of toxicity of the dust produced, reactivity of cyanuric chloride with moisture in the air, problems of temperature control, and inefficient grinding.

The present invention resides in the concept of an improvement in the method of comminuting relatively large solid particles of cyanuric chloride, a substantial proportion of which are 50 to 200 microns or larger in size, to produce finely divided cyanuric chloride composed of solid particles substantially none of which are greater than 15 microns in size and at least 85 percent of which are 2 to 8 microns in size, said improvement consisting in comminuting the relatively large solid particles in a fluid energy attrition apparatus.

Our novel method for comminuting cyanuric chloride is distinctly advantageous since it eliminates all of the aforementioned difficulties inherent in the other methods of attrition. Thus, by employing fluid energy attrition we obtain cyanuric chloride in a finely divided, free-flowing and uncontaminated condition. Hydrolysis, to which cyanuric chloride is prone, is essentially eliminated. Further, the cyanuric chloride is obtained in a form making it available for immediate use without involving additional manipulative steps for the removal of grinding aids such as sand, steel shot or fluids.

The fluid energy type attrition apparatus used in the practice of this invention is commercially available and is generally known as a fluid energy mill. Although such apparatus varies in design, depending upon the manufacturer, the principle of operation for all fluid energy mills is the same. Apparatus of the types described in U.S. Pat. Nos. 2,032,827, 2,315,083 and 2,219,011 are representative of three basic designs of fluid energy mills. Fundamentally, the reduction of the particle size of the material being comminuted in fluid energy type attrition apparatus is caused by the impinging of the particles on each other. The energy required for this action is transferred by means of a fluid. As used here, fluid means any elastic fluid, for example, air, steam, active or inert gases or any combination of these. The fluid energy mill consists of a reduction chamber, and injector and a series of gaseous jets issuing through nozzles spaced around a portion of the periphery of the reduction chamber. The injector consists of a gaseous feed jet which, by venturi effect, introduces the material to be ground into the reduction chamber. The pressurized fluid is discharged at sonic or supersonic velocity by means of the nozzles into the reduction chamber where it is converted to velocity energy. The nozzles are oriented in a manner so that there is a controlled system velocity in the reduction chamber. The operating pressures at the nozzles may be varied from 60 to 120 pounds per square inch (gauge) when using air as the fluid. The material to be ground is fed into the reduction chamber by the injector and is captured by the stream of circulating fluid. The particles of solid are broken up by impact and abrasion with each other produced by the violent jet action in the reduction chamber. The design of the reduction chamber is such that the fluid supplying the grinding energy is withdrawn at an inward point, tending to cause the dust-laden gas to travel spirally. The smaller particles are carried out with the gas to a collector, and the coarser particles are thrown to the periphery for further grinding. Thus, by its design, the grinding chamber also serves as an integral classifier.

Although in the practice of our invention we have found it convenient to employ fluid energy grinding apparatus of the general design of the apparatus described in U.S. Pat. No. 2,219,011, the process of our invention is not limited thereto. Fluid energy mills having the designs described in U.S. Pat. Nos. 2,032,827 and 2,315,083 are equally suitable for carrying out our invention. In practice we use compressed air to supply the required grinding and feed energy. We prefer to use predried air at a temperature between 25° and 50° C., at a grinding nozzle pressure between 60 and 120 pounds per square inch (gauge) at a rate between 150 and 800 cubic feet per minute and at a feed nozzle pressure of about 5 pounds per square inch less than the grinding nozzle pressure. The particular nozzle pressure and volume of air to be chosen depend upon the design of the fluid energy attrition apparatus to be employed, the feed and collection systems used in conjunction therewith, and the degree of fineness desired in the comminuted cyanuric chloride. We have thus found that when solid cyanuric chloride particles, a substantial proportion of which are 50 to 200 microns and larger are comminuted as described above, finely divided solid cyanuric chloride particles substantially none of which are greater than 15 microns in size and having at least 85 percent of the particles with an average particle size from 2 to 8 microns are obtained.

Our invention is further illustrated by the following examples, but is not to be construed as limited thereto.

EXAMPLE 1

A total of 1,000 pounds of white, crystalline cyanuric chloride consisting of crystals approximately 50 to 200 microns in diameter was subjected to comminution in a Model No. 0405 Jet-O-Mizer Mill (a fluid energy attrition apparatus manufactured and supplied by the Fluid Energy Processing and Equipment Co., Lansdale, Pa.) using predried and precooled compressed air having a dew point of −40° F. at a temperature of 50° F. at the mill. Of the four nozzles supplying the grinding energy to the grinding chamber, the two used on the feed side had 9/32-inch bore while the other pair were 5/16-inch bore. The feed nozzle was of 3/8-inch bore. The mill was operated at a mill nozzle pressure of 85 pounds per square inch and a feed nozzle pressure of 80 pounds per square inch. Finely divided solid cyanuric chloride was obtained at the rate of 8.7 pounds per minute. The resulting solid was examined under a microscope and found to contain substantially no particles greater then 15 microns in size. Ninety to 95 percent of the particles were found to be less than 5 to 10 microns and to average about 2 to 8 microns in diameter. The product was pure white, free flowing and contained substantially no fragments of iron.

EXAMPLE 2

Using the equipment described in example 1 hereinabove, a total of 600 pounds of white, crystalline cyanuric chloride (approximately 50 to 200 microns in diameter) was comminuted using compressed air (−40 ° F. dew point and 50° F. at the mill) at a mill nozzle pressure of 100 pounds per square inch and a feed nozzle pressure of 95 pounds per square inch. The resulting white, free-flowing finely divided cyanuric chloride was obtained at the rate of 7.5 pounds per minute substantially free of contaminating material and consisted of 90 to 95 percent of particles less than 5 to 10 microns and averaging 2 to 8 microns in diameter with substantially none of the particles exceeding 15 microns in diameter.

Cyanuric chloride having an average particle size of 2 to 8 microns obtained by the procedures described in example 1 and example 2 was used for the preparation of commercial optical brightener, disodium 4,4'-bis(4-anilino-6-morpholino-s-triazin-2-ylamino)-2,2'-stilbenedisulfonate. Thus, as a first step, the disodium salt of 4,4'-diaminostilbene-2,2'-disulfonic acid was interacted with two molecular equivalents of the finely divided solid cyanuric chloride to obtain 4,4'-bis(4,6-dichloro-s-triazin-2-ylamino)-2,2'-stilbenedisulfonate. This was then interacted with two molecular equivalents of aniline as one step and with two molecular equivalents of morpholine as another step. When prepared on a commercial scale, the yield and the quality of the thus obtained disodium 4,4'-bis(4-aniline-6-morpholino-s-triazin-2-ylamino)-2,2'-stilbenedisulfonate were substantially superior to the yield and quality of the same product prepared on a comparable commercial scale either from finely divided solid cyanuric chloride which had been prepared by precipitation in water from an acetone solution or from the interaction of the cyanuric chloride dissolved in a water-immiscible organic solvent with an aqueous solution of the diamino stilbenedisulfonic acid.

We claim:

1. The method of producing finely divided cyanuric chloride composed of solid particles substantially none of which are greater than 15 microns in size and at least 85 percent of which are 2 to 8 microns in size, which comprises comminuting relatively large solid particles of cyanuric chloride, a substantial proportion of which are 50 to 200 microns or larger in size, in a fluid energy attrition apparatus wherein said fluid is predried air.